US006059435A

United States Patent [19]

Hamm et al.

[11] Patent Number: 6,059,435

[45] Date of Patent: May 9, 2000

[54] HEADLIGHT OF A VEHICLE FOR HIGH BEAM LIGHT AND LOW BEAM LIGHT

[75] Inventors: Michael Hamm, Pfullingen; Henning Hogrefe, Walddorfhaeslach; Heinz Grimm, Pfullingen, all of Germany

[73] Assignee: Robert Bosch GmbH, Stuttgart, Germany

[21] Appl. No.: 09/168,121

[22] Filed: Oct. 7, 1998

[30] Foreign Application Priority Data

Dec. 18, 1997 [DE] Germany ........................... 197 56 437

[51] Int. Cl.[7] ........................................ B60Q 1/06

[52] U.S. Cl. .......................... 362/514; 362/512; 362/538; 362/284

[58] Field of Search ............................ 362/36, 464, 465, 362/466, 512, 513, 514, 515, 517, 518, 538, 539, 516, 277, 282, 283, 284

[56] References Cited

U.S. PATENT DOCUMENTS

| | | | |
|---|---|---|---|
| 1,834,542 | 12/1931 | Karlebo | 362/512 |
| 4,875,141 | 10/1989 | Miyauchi et al. | 362/465 |
| 4,908,560 | 3/1990 | Shibata et al. | 362/465 |
| 4,967,319 | 10/1990 | Seko | 362/466 |
| 5,023,758 | 6/1991 | Allen et al. | 362/514 |
| 5,060,120 | 10/1991 | Kobayashi et al. | 362/465 |
| 5,099,400 | 3/1992 | Lee | 362/466 |
| 5,142,455 | 8/1992 | Kosmatka | 362/514 |
| 5,213,406 | 5/1993 | Neumann et al. | 362/512 |
| 5,251,110 | 10/1993 | Leleve | 362/512 |
| 5,673,990 | 10/1997 | Neumann et al. | 362/539 |

FOREIGN PATENT DOCUMENTS

| | | | |
|---|---|---|---|
| 2056996 | 5/1971 | Germany | 362/465 |
| 40 02 576 A1 | 8/1991 | Germany | F21M 3/18 |
| 294589 A2 | 12/1988 | Japan | 362/512 |
| 401109140A | 4/1989 | Japan | 362/465 |
| 401115751A | 5/1989 | Japan | 362/514 |
| 405058364A | 3/1993 | Japan | 362/466 |
| WO 87/01662 A1 | 3/1987 | WIPO | 362/512 |

*Primary Examiner*—Cassandra Spyrou
*Assistant Examiner*—John Juba, Jr.
*Attorney, Agent, or Firm*—Michael J. Striker

[57] ABSTRACT

The headlight has a light source (10) in the form of a gas discharge lamp and a reflector (12) which has a first reflector part (16) and a second reflector part (18). A converging light beam is reflected from the first reflector part (16) and a lens (26) and a stop (22) with an edge (24) for producing a light-dark boundary are arranged in the path of that beam. The second reflector part (18) is arranged above and/or beside the first reflector part (16) and is moveable between a position for low beam light, in which a light beam directed downward is reflected from it, and a position for high beam light, in which a light beam with a greater range is reflected from it. The light reflected by the second reflector part (18) in the position for low beam light can issue from the headlight and contribute to the formation of the low beam or be absorbed inside the headlight. A completely effective high beam is formed by a combination of the light reflected from the second reflector part (18) with the light reflected from the first reflector part (16) in the operating configuration for the high beam light.

11 Claims, 7 Drawing Sheets

HEADLIGHT OF A VEHICLE FOR HIGH BEAM LIGHT AND LOW BEAM LIGHT

BACKGROUND OF THE INVENTION

1. Field of the Invention

The present invention relates to a headlight of a vehicle that produces a high beam and/or a low beam and, more particularly, to a headlight of a vehicle for high beam light and low beam light comprising a light source in the form of a gas discharge lamp and a reflector, by which light propagated from the light source is reflected.

2. Prior Art

This type of headlight is described in German Patent Application DE 40 02 576 A1. This headlight has a light source in the form of a discharge lamp and a reflector, by which light propagated from the lamp is reflected. The reflector has a first part, by which light is reflected which forms the low beam in the operating configuration for the low beam light. The reflector also has a second part by which light is reflected which, together with the light reflected from the first part of the reflector, forms the high beam in the operating configuration for the high beam light. The second part of the reflector is arranged under the first part so that light propagated from the light source is directed downward. It has been proven that internal components, especially metal salts, are deposited in the lower peripheral region of the discharge lamp, whereby the light propagated downward from the discharge lamp is uncontrollably scattered. Because of that light propagated from the light source cannot be reflected from the second part of the reflector in the required manner as a completely effective high beam. Furthermore only light reflected by the first part of the reflector is used for forming the low beam in the operating configuration for the low beam so that the efficiency of the headlight is not the best. In the operating configuration for the high beam a high beam is propagated from the headlight with fixed unchangable characteristics so that optimum illumination cannot be obtained in all driving and weather conditions.

SUMMARY OF THE INVENTION

It is an object of the present invention to provide a headlight for a vehicle of the above-described type that does not have the above-described disadvantages.

These objects, and others which will be made more apparent hereinafter, are attained in a headlight of a vehicle for a high beam and a low beam comprising a light source and a reflector by which light propagated from the light source is reflected, in which at least light reflected by a first part of the reflector forms the low beam in the operating configuration for low beam light, in whose path a lens and a diaphragm or stop with an edge for producing the light-dark boundary are arranged and light reflected from a second part of the reflector together with the light reflected by the first part of the reflector forms the high beam in the operating configuration for the high beam light.

According to the invention, the second part of the reflector is at least substantially above and/or beside or lateral to the first part.

The headlight of the invention has the advantage that light propagated from the light source can be reflected by the second part of the reflector and this reflected light can be controlled in a predetermined manner.

Other embodiments of the invention are set forth in the appended dependent claims.

Both the low beam light and also the high beam light are improved by the reflected light from the second reflector part when the second reflector part is movable so that it contributes to the formation of the low beam in the operating configuration for low beam light and forms a more concentrated beam in the operating configuration for the high beam light than in the operating configuration for the low beam light.

The characteristics of the light beam reflected from the second reflector part can be further changed when the second reflector part is movable longitudinally at least approximately in a direction along its optic axis.

A change of the direction of the light reflected by the second reflector part is possible in order to follow changes in the steering direction or changes in the course of the roadway when the second reflector part is pivotable about a vertical pivot axis.

BRIEF DESCRIPTION OF THE DRAWING

The objects, features and advantages of the present invention will be explained in more detail by the following examples with reference to the drawing, in which.

DESCRIPTION OF THE PREFERRED EMBODIMENTS

Figure 1:
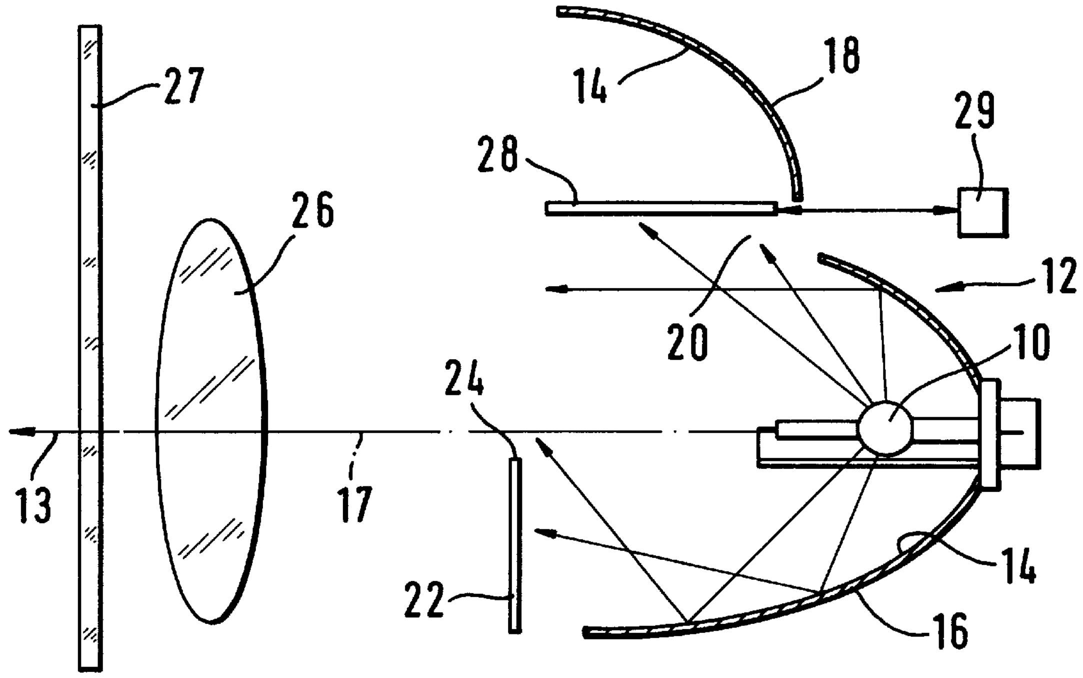
FIG. 1 is a vertical longitudinal cross-sectional view through a headlight according to a first embodiment of the invention in an operating configuration for low beam light.
Figure 3:
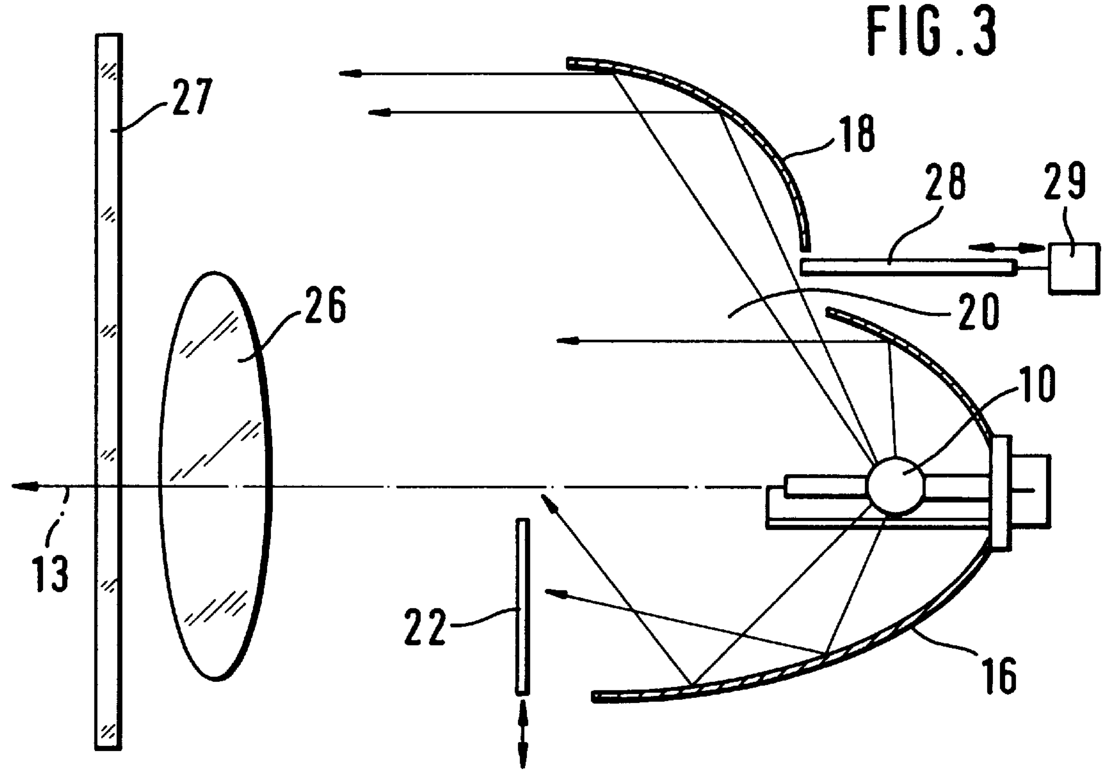
FIG. 3 is a vertical longitudinal cross-sectional view through the headlight according to the first embodiment of the invention in an operating configuration for high beam light.

A first embodiment of a headlight for a vehicle, especially a motor vehicle, according to the invention shown in FIGS. 1 and 3 can be operated to produce either a high beam or a low beam according to choice. The headlight has a light source 10, which is preferably a gas discharge lamp but can also be an incandescent lamp. The light source 10 is mounted in a reflector 12, which has a concave reflection surface 14. The reflector 12 has a first part, in which the light source 10 is mounted, and a second part 18 arranged substantially above the first part 16. Both parts 16 and 18 can be formed in one piece or as separate components. The second part 18 of the reflector 12 is displaced in the light propagation direction 13 relative to the first part 16. The first reflector part 16 has an opening 20 in its upper peripheral section in the vicinity of the second reflector part 18, through which light propagated from the light source 10 can arrive at the second reflector part 18.

The first part 16 of the reflector 12 is formed so that light propagated by the light source 10 is reflected as a convergent light beam. The first reflector part 16 cain be formed for example so that a longitudinal section containing its optic axis 17 results in an at least approximately elliptical curve. A light impermeable stop or diaphragm 22 extending substantially below the optic axis 17 of the first reflector part 16 is arranged in the path of the light beam formed by the light reflected from the first reflector part 16. The stop 22 has an upper edge 24 by which a light-dark boundary of the light beam reflected from the first reflector part 16 and passing by it is produced. The position and course of the edge 24 of the diaphragm or stop 22 determines the position and course of the light-dark boundary of the light beam issuing from the headlight in the operating configuration for low beam light. The light beam passing by the stop 22 passes through a lens 26 that is preferably formed as a collecting lens. The light beam reflected by the first reflector part 16 acquires the characteristics required for the low beam issuing from the headlight when it passes through the lens 26. The characteristics of a light beam of course include the illumination intensities it produces as well as its direction and scatter.

A light-blocking screen 28 associated with the second reflector part 18, which can be in the form of a plate, is inserted between the light source 10 and the second reflector part 18. The light-blocking screen 28 can be constructed so that the opening 20 of the first reflector 16 can be substantially closed by it. The headlight in FIG. 1 is shown in the operating configuration for low beam light, in which the light-blocking screen 28 is arranged so that light propagated to it from the light source 10 toward the second reflector part 18 is blocked from it and cannot impinge on it. Only the light beam reflected from the first reflector part 16, passing the stop 22 and through the lens 26 can issue from the headlight. The light outlet opening of the headlight can be covered with a light permeable disk 27, which can be substantially smooth, so that light passes through it substantially uneffected, or it can have an optical shape or profile, by which light passing through it is deflected or scattered.

Figure 2:
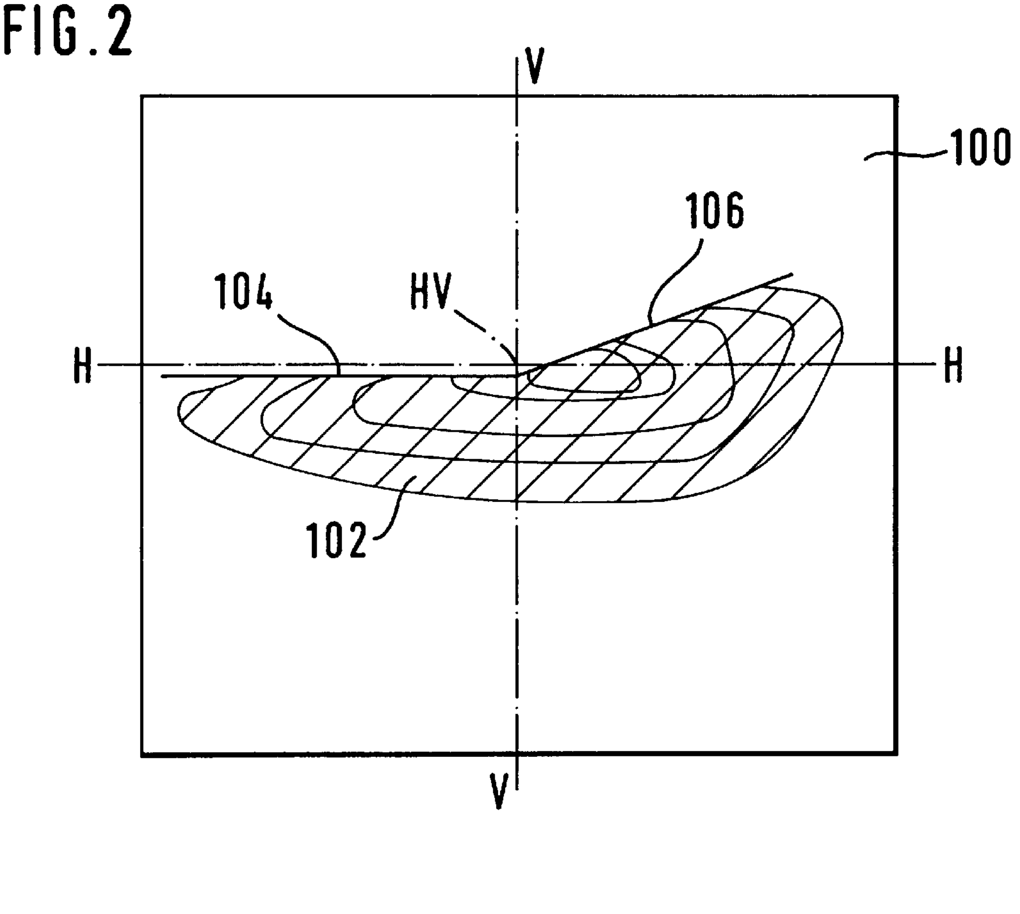
FIG. 2 is a plan view of a measuring screen placed in front of the first embodiment of the headlight illuminated by the light beam from the headlight in the operating configuration for low beam light.

A measuring screen 100 shown in FIG. 2 is arranged spaced from the headlight in front of it and is illuminated by the light beam issuing from the headlight. A horizontal center plane HH and a vertical center plane VV intersect the measuring screen 100 perpendicular to each other and to the measuring screen. The horizontal center plane HH and the vertical center plane VV intersect each other and the measuring screen at the center point HV. The measuring screen 100 is illuminated in a region 102 by the light beam propagated from the headlight in the operating configuration for low beam light. The region 102 is bounded on its upper side on the opposing traffic side, which is on the left side of the vertical center plane VV of the measuring screen 100 in the embodiment shown for right hand traffic, by an approximately horizontal light-dark boundary 104. The horizontal light-dark boundary 104 extends somewhat below the horizontal center plane HH of the measuring screen 100. The region 102 is bounded by a light-dark boundary 106 climbing above the horizontal center plane HH from the horizontal section 104 toward the right edge of the measuring screen 100 on its own traffic side. Its own traffic side in this case is the region to the right side of the vertical center plane VV of the measuring screen 100. The highest light intensities are present in a zone under the point HV and the light intensities decrease from there to the edges of the region 102.

The headlight shown in FIG. 3 is in the operating configuration for high beam light. In this operating configuration the light-blocking device 28 is drawn back in a direction opposite to the light propagation direction and thus the opening 20 is unblocked, so that light issuing from the light source 10 can reach the second reflector part 18. Light propagated from the light source 10 is reflected as a concentrated light beam from the second reflector part 18, which has a greater range and is more concentrated than the light beam reflected from the first reflector part 16. The light beam reflected from the second reflector part 18 does not pass through the lens 26. It can be provided that the disk 27 has an optical shape or profile through which the light beam reflected from the second reflector part 18 passes. The second reflector part 18 can alternatively have a numerically determined shape, which is determined by the characteristics desired for the light beam reflected by the second reflector part 18.

Figure 4:
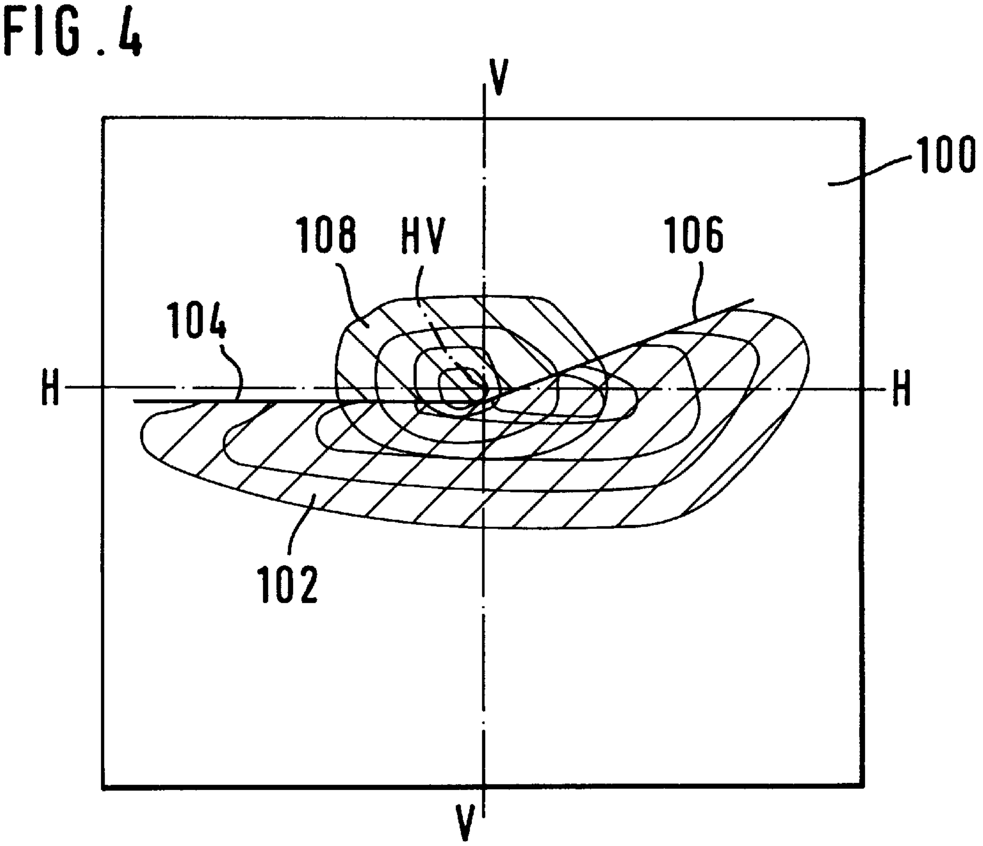
FIG. 4 is a plan view of a measuring screen placed in front of the first embodiment of the headlight illuminated by the light beam from the headlight in the operating configuration for high beam light.

The measuring screen shown in FIG. 4 is illuminated by the light beam propagated by the headlight in the operating configuration for high beam light. The measuring screen 100 is illuminated in the region 102 by the light beam reflected from the first reflector part 16 as in the operating configuration for the low beam light. Also a region 108 of the measuring screen 100 above the light-dark boundary 104, 106 of the region 102 is illuminated by the light beam reflected from the second reflector part 18. The highest light intensities are present in the region 108 in a zone around the center point HV and decrease toward the edge of the region 108. It can be provided that the region 108 is substantially adjacent to the region 102 without overlapping it, so that the illumination intensities in the region 102 are not increased. Alternatively it can be provided that the region 108 partially overlaps the region 102 so that increased light intensities are present in the overlapping region.

The motion of the light-blocking device 28 between its position in the operating configuration for the low beam light according to FIG. 1 and its position in the operating configuration for the high beam light according to FIG. 3 is caused by means of an adjusting member 29 which is electrically, electromagnetically, hydraulically or pneumatically driven. The operator of the vehicle operates a switching element to switch between the operating configuration for the low beam light and the high beam light. This activates the adjusting member 29 directly or via a known control means and moves the light-blocking device or screen 28 because of that. Also in addition to the motion of the light-blocking device 28 the stop 22 can be moved in the operating configuration for the high beam light so that its edge 24 can project somewhat further into the path of the light beam reflected from the first reflector part 16. The stop 22 can be directly vertically movable from below into the beam or can be pivotable about a horizontal axis. The motion of the step 22 can be caused by the same adjusting member 29 as that for the light-blocking device 28, which for example engages by means of a suitable lever or pulling connector on the stop 22, or by a separate adjusting member.

Figure 5:
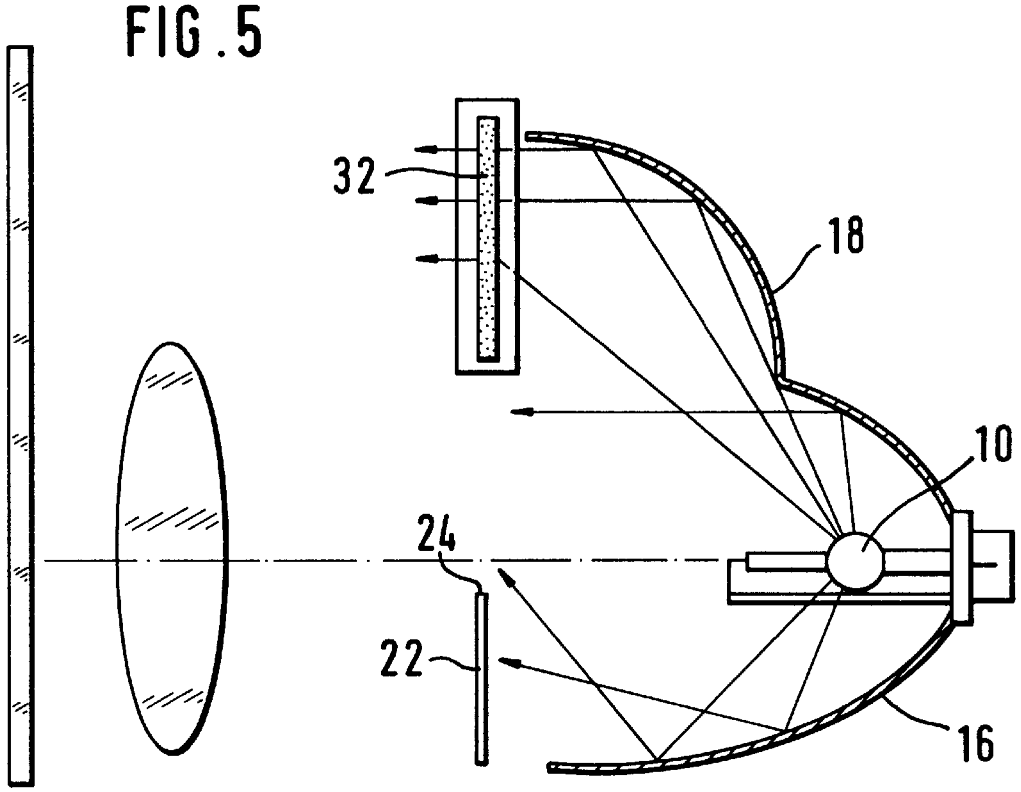
FIG. 5 is a vertical longitudinal cross-sectional view through a headlight according to a second embodiment of the invention.

In the headlight according to a second embodiment shown in FIG. 5 the structure of the headlight regarding the reflector part 16 and the reflector part 18 is unchanged from the first embodiment but the structure of the light-blocking device 32 is changed. The light-blocking device 32 is arranged in the path of the light beam reflected from the second reflector part 18 and constructed as a screen with changeable light permeability. The screen 32 preferably comprises an electrochromic or electrooptic material, which changes its light permeability under the influence of an electrical potential applied to it. The screen 32 is switched to a state having the lowest possible light permeability in the operating configuration for low beam light and into a state having the highest possible light permeability in the operating configuration for high beam light. The screen 32 can also be arranged between the light source 10 and the second reflector part 18 as in the headlight according to the first embodiment. Also the stop 22 can be constructed like the screen 32 wherein its edge 24 is formed by the edge of the light impermeable region of the stop 22. The position and course of the edge 24 can be changed by suitable expansion of the light impermeable region of the stop 22, by applying an electrical potential to the appropriate portion of the stop 22 or not. The electrical potential applied to the stop 22 can be controlled so that the edge 24 of the stop is higher in the operating configuration for low beam light than in the operating configuration for high beam light. This embodiment of the stop 22 can also be provided in the headlight according to the first embodiment.

Figure 6:
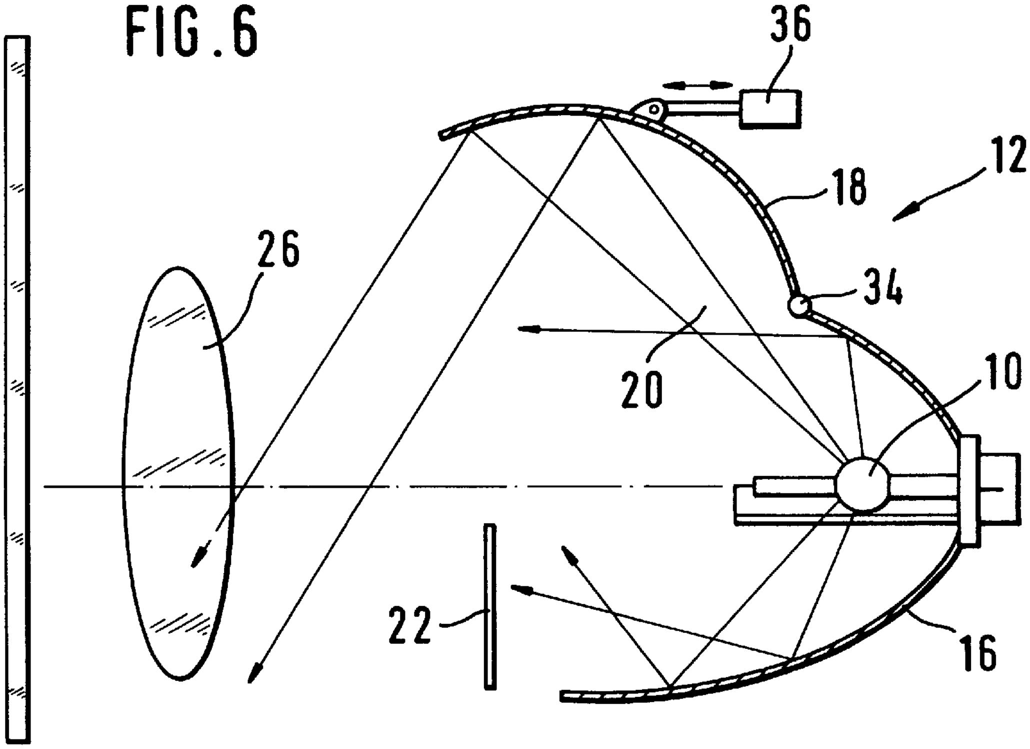
FIG. 6 is a vertical longitudinal cross-sectional view through a headlight according to a third embodiment of the invention in an operating configuration for low beam light.
Figure 7:
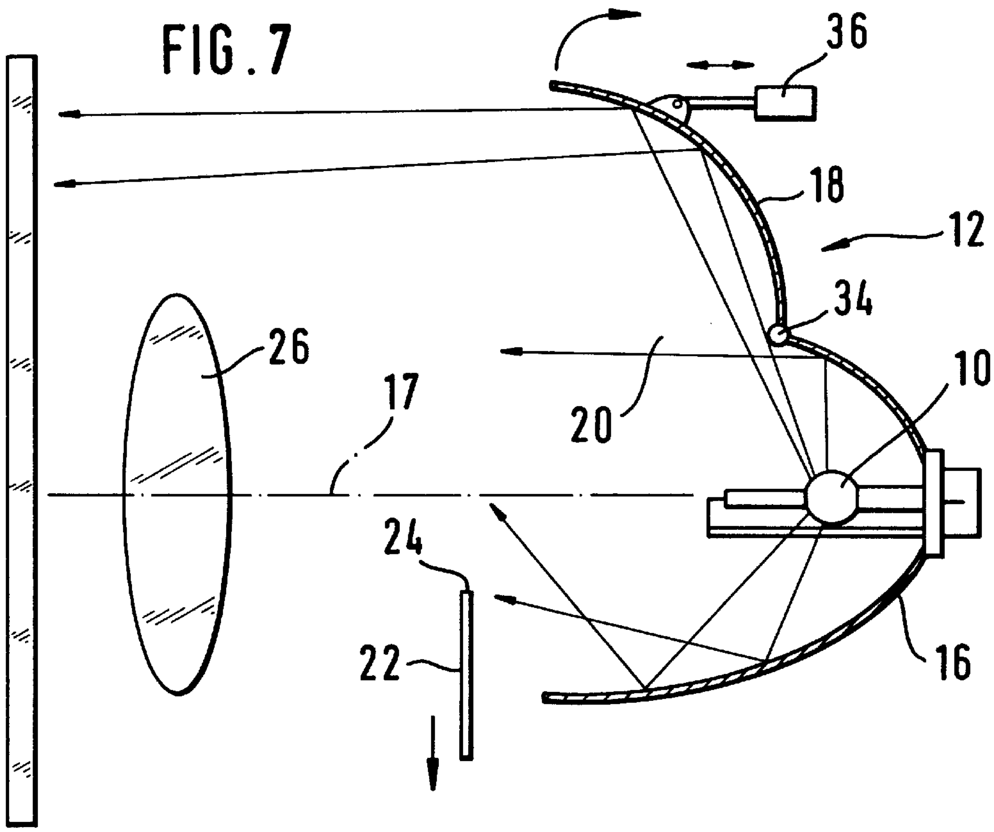
FIG. 7 is a vertical longitudinal cross-sectional view through the headlight according to the third embodiment of the invention in an operating configuration for high beam light.

A headlight according to a third embodiment shown in FIGS. 6 and 7 has a reflector 12 comprising a first reflector part 16 and a second reflector part 18 as in the previous embodiments. The first reflector part 16 is the same as in the first embodiment and the stop 22 and the lens 26 are arranged in the path of the light beam reflected from it. The first reflector part 16 has an opening 20 in its upper peripheral section, through which light issuing from the light source 10 can arrive at the second reflector part 18. The second reflector part 18 can pivot about an at least approximately horizontal pivot axis 34. The axis 34 preferably extends approximately on the lower edge bordering the second reflector part 18. The pivoting of the second reflector part 18 about the axis 34 is caused by an eccentric adjusting element 36 engaged on the second reflector part 18.

The headlight in FIG. 6 is shown with the second reflector part 18 in the operating configuration for low beam light. The measuring screen 100 according to FIG. 2 is illuminated in the region 102 by the light beam reflected from the first reflector part 16. The second reflector part 18 is located in a pivot position about the axis 34 in which light propagated from the light source is reflected as a light beam directed downwardly. The second reflector part 18 is arranged defocused in regard to the light source 10 in the operating configuration of the low beam light, which means that the focal point of the second reflector part 18 does not coincide with the light source 10. The light beam reflected by the second reflector part 18 is propagated from the headlight and contributes to the formation of the low beam and illuminates especially the area in front of the vehicle. A lower zone of the region 102 on the measuring screen 100 is illuminated by the light beam reflected by the second reflector part 18. The light beam reflected by the second reflector part 18 can pass through the lens 26 or pass by it. Alternatively it can be provided that the light beam directed downwardly, reflected by the second reflector part 18 cannot be propagated from the headlight and is absorbed in the headlight.

The headlight shown in FIG. 7 is illustrated with the reflector part 18 in the operating configuration for high beam light. The second reflector part 18 is pivotable upwardly about the pivot axis 34 from its position according to FIG. 6. A concentrated, little-scattered light beam is reflected from the second reflector part 18. This concentrated light beam is propagated approximately parallel to the optic axis 17 of the first reflector part 16 and is no longer directed downward. The position of the edge 24 of the stop 22 as in the first embodiment can be changed so that it is moved downward and projects somewhat further into the path of the light beam reflected by the first reflector part 16. The adjusting motion of the stop for that purpose can be produced by the same adjusting element or member 36 which produces the motion of the second reflector part 18 or by a separate adjusting element.

Figure 8:
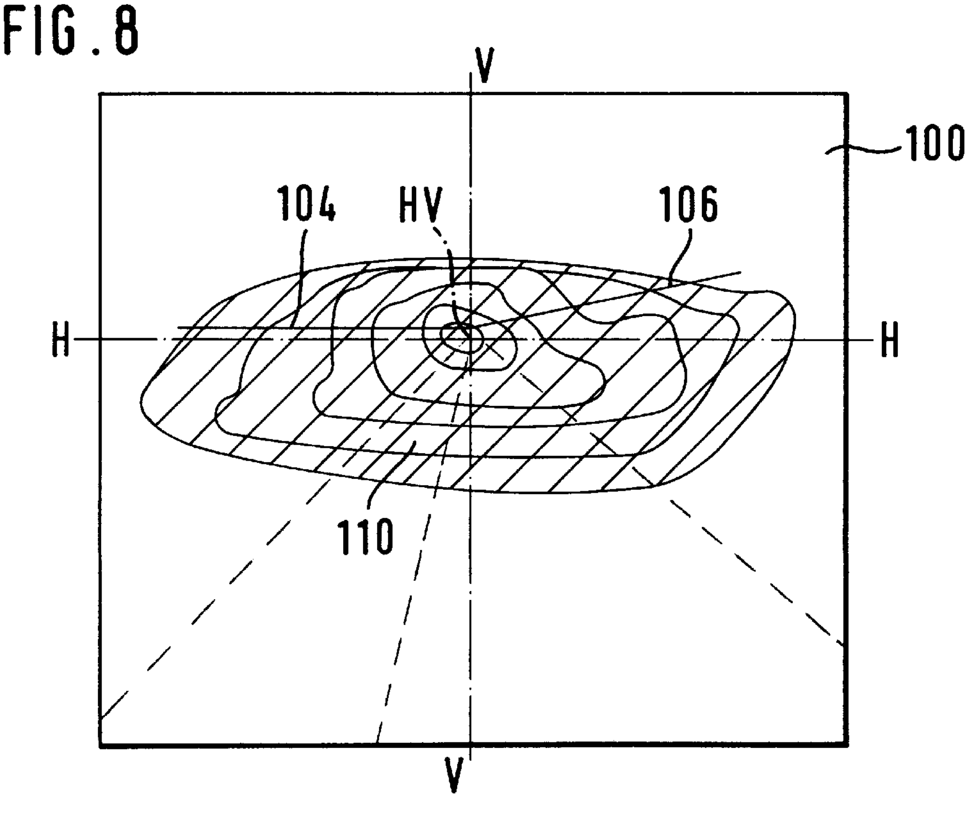
FIG. 8 is a plan view of a measuring screen placed in front of the third embodiment of the headlight illuminated by the light beam from the headlight in the operating configuration for high beam light.

A measuring screen 100 is shown in FIG. 8 arranged in front of the headlight. This measuring screen is illuminated by the light beam propagated from the headlight in the operating configuration for high beam light. The measuring screen 100 is illuminated in a region 110, which extends somewhat symmetrically on both sides of the vertical center plane VV of the measuring screen 100 and projects above the horizontal center plane HH. The highest illumination intensities are present in a zone around the center point HV which are produced substantially by the concentrated little-scattered light beam reflected from the second reflector part 18. The light-dark boundary 104,106 of the light beam reflected from the first reflector part 16 is arranged somewhat higher and a little sharper by motion of the edge 24 of the stop 22 than in the operating configuration of the low beam light. All together a homogeneous illumination intensity distribution results in the region 110.

Figure 9:
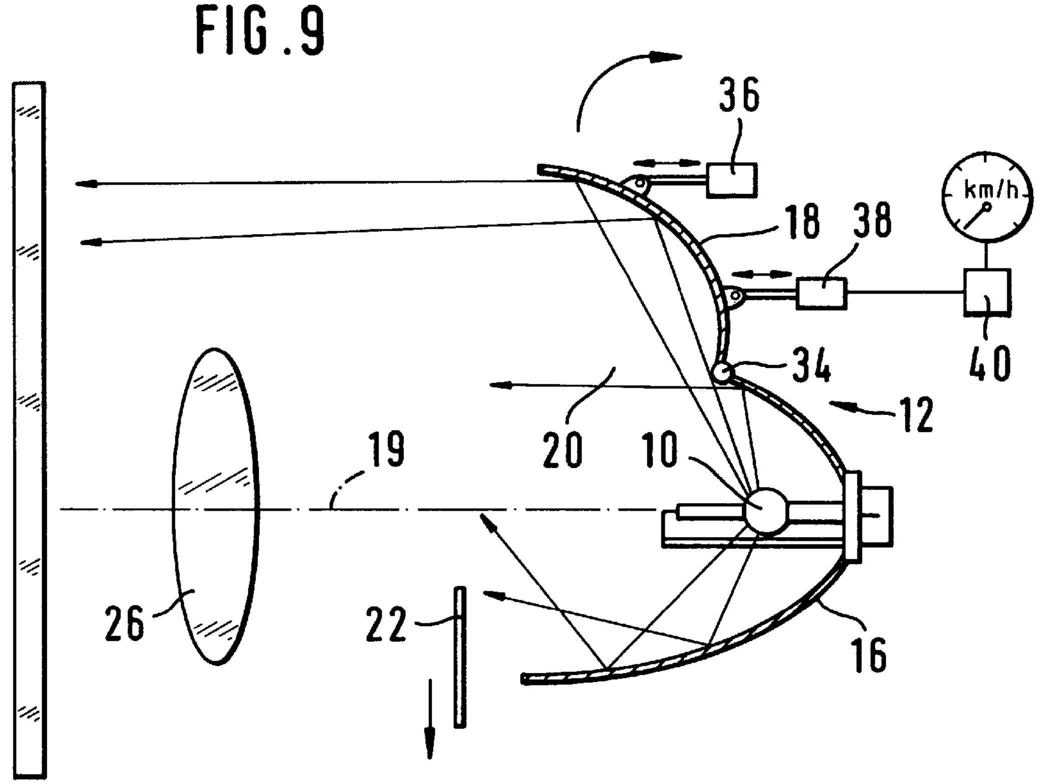
FIG. 9 is a vertical longitudinal cross-sectional view through a headlight according to a fourth embodiment of the invention in an operating configuration for high beam light with a reflector part in a first position.
Figure 10:
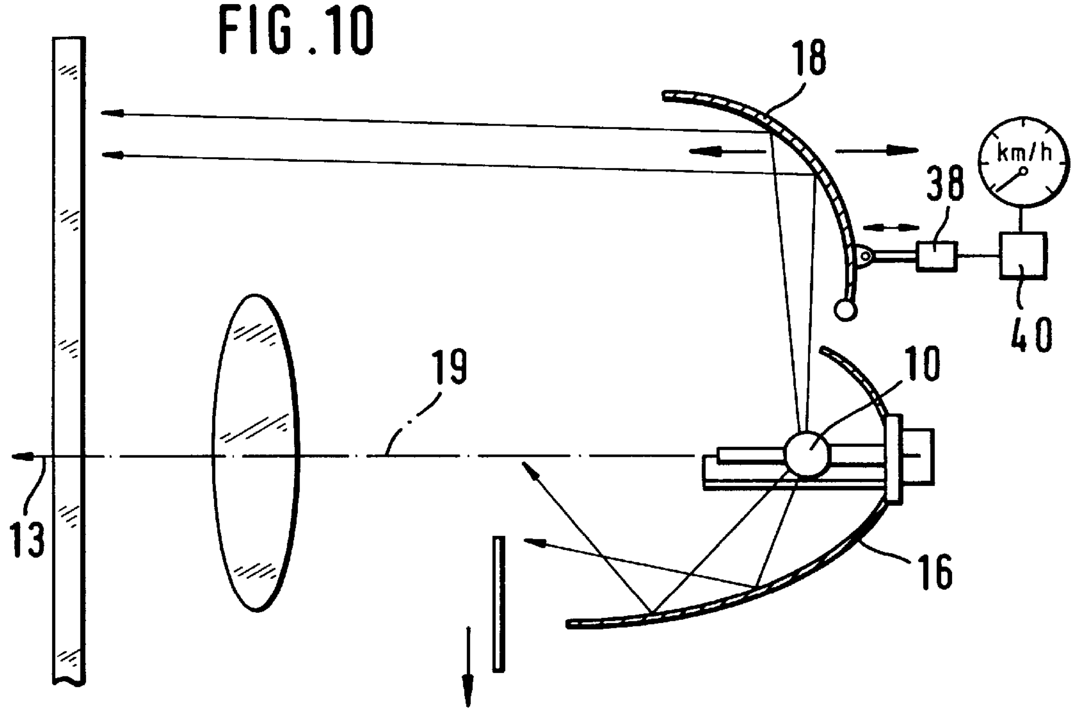
FIG. 10 is a vertical longitudinal cross-sectional view through the headlight according to the fourth embodiment of the invention with the reflector part in a second position.

A headlight according to a fourth embodiment, in which the reflector 12 again has a first part 16 and a second part 18, is shown in FIGS. 9 and 10. The first reflector part 16 is formed the same as in the first embodiment and the stop 22 and lens 26 are arranged in the path of the light beam reflected from it. The first reflector part 16 has an opening 20 provided in its upper peripheral section, through which light issuing from the light source 10 can reach the second reflector part 18. The second reflector part 18 is pivotable about the horizontal axis 34 between a position for low beam light according to FIG. 6 and a position for high beam light according to FIG. 9 as in a third embodiment. The second reflector part 18 is pivotable about axis 34 into its upward position for high beam light, also at least approximately in the direction of its optic axis 19. The motion of the second reflector part 18 in the direction of its optic axis 19 can be caused by the same adjusting member 36 as its pivoting motion about the axis 34, or by another separate adjusting member 38. Light propagated from the light source 10 is reflected with different characteristics by the second reflector part 18 because of the motion of it in the direction of its optic axis 19.

The headlight shown in FIG. 9 is illustrated in the operating configuration for high beam light with the second reflector part 18 in a first position in the direction of its optic axis 19. The second reflector part 18 is pivotable upward only about the axis 34 from its position for low beam light. The second reflector part 18 is in a position focussed on the light source 10, which means its focal point at least approximately coincides with or falls on the light source 10. Light propagated from the light source 10 is reflected by the second reflector part 18 as a concentrated light beam with reduced scatter. The measuring screen 100 is illuminated in a region 110 as illustrated in FIG. 8 by the light beam reflected from the second reflector part 18 in its position according to FIG. 9 and by the light beam reflected from the first reflector part 16 with the stop 22 moved downward.

Figure 11:
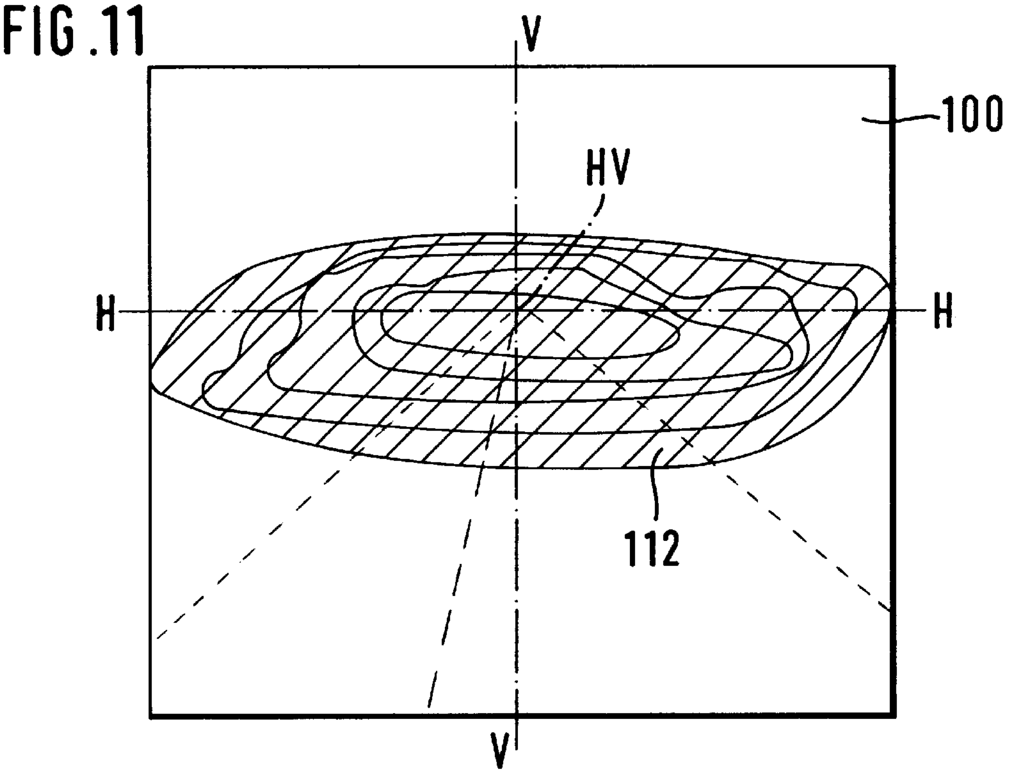
FIG. 11 is a plan view of a measuring screen placed in front of the fourth embodiment of the headlight illuminated by the light beam from the headlight with the reflector part in the second position.

The headlight is shown in FIG. 10 in a second position in relation to its optic axis 19 in the operating configuration for high beam light. The second reflector part 18 is arranged displaced in a direction along its optic axis opposite to the light propagation direction 13 in contrast to its first position shown in FIG. 9 and thus is defocused at the light source 10, which means its focal point does not fall on the light source 10. Light propagated from the light source 10 is reflected by the second reflector part 18 in its second position as a more strongly scattered light beam at least in the horizontal direction than in its first position. The measuring screen 100 arranged in front of the headlight shown in FIG. 11 is illuminated in region 112 by the entire light beam propagated from the headlight. The region 112 has a greater horizontal width than the corresponding region 110 in FIG. 8 that depends on the horizontal scattering of the light beam reflected from the second reflector part 18. The maximum illumination intensities in the region 112 are present in a zone around the center point HV but these are less than in the region 110. The characteristics of the light beam reflected by the first reflector part 16 remain unchanged.

The motion of the second reflector part 18 in a direction of its optic axis by means of the adjusting member 38 can, for example, depend on the speed of the vehicle. A controller 40 can be provided, by which the speed of the vehicle is determined and the adjusting member 38 is controlled according to the speed determined by it. The second reflector part 18 is advantageously placed in its first position according to FIG. 9 at the higher vehicle speeds in order to obtain an effective concentrated illumination of the far region in front of the vehicle according to FIG. 8. The second reflector part 18 can be arranged or placed in its second position at reduced speeds in order to provide a wide illumination in front of the vehicle according to FIG. 11. The motion of the second reflector part in a direction along its optic axis 19 can occur continuously dependent on the speed or between at least two definite positions and on exceeding or dropping below a predetermined speed. The adjustability of the second reflector part 18 in the direction of its optical axis can also be provided in the headlight according to the first or second embodiment, in which the second reflector part 18 is not pivotable about the axis 34 as in the third embodiment. The controller 40 can also receive information from sensor devices besides the speed, for example road conditions or weather conditions, which means dryness or wettness of the road or fog. The second reflector part 18 can be adjusted along the optical axis 19 according to this information, especially the second reflector part 18 can be moved into its second position according to FIG. 10 so that a scattered light beam is reflected by it.

Figure 12:
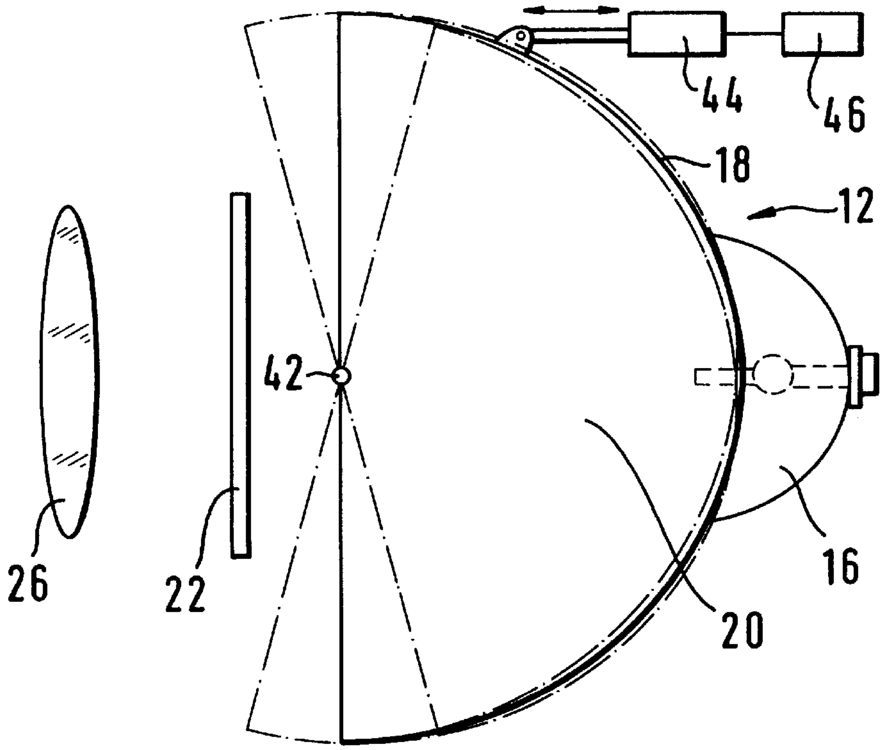
FIG. 12 is a top view of a headlight according to a fifth embodiment of the invention.

A headlight according to a fifth embodiment, in which the reflector 12 again has a first reflector part 16 and a second reflector part 18, is shown in FIG. 12. The first reflector part 16 is constructed in the same way as in the first embodiment and the stop 22 and the lens 26 are arranged in the path of the light beam reflected from it. The first reflector part 16 has an opening 20 in its upper peripheral section, through which light propagated from the light source 10 can reach the second reflector part 18. The second reflector part 18 is pivotable about an at least approximately vertical axis 42 by means of an adjusting member 44 that is engaged with it and eccentric to the axis 42. The path of the light beam reflected by the second reflector part 18 is changed in the horizontal direction by pivoting this second reflector part 18 about vertical axis 42. The adjusting member 44 is activated by a controller 46, for example by means of the steering drive of the vehicle. The adjusting member is activated by the controller 46 so that the second reflector part 18 is pivotable in the direction of the steering drive about the axis 42 and the light beam reflected from the second reflector part 18 travels in the direction of the steering drive. Because of that the illumination in front of the vehicle in the actual driving direction is improved when traveling around a curve. The controller 46 can also receive information from the vehicle navigation system alternatively or in addition to the steering drive. Data including the course of the roadway are contained in the navigation system and it contains satellite information regarding the whereabouts of the vehicle on the road, so that the further course of the road in front of the vehicle can be determined. The adjusting member 44 is activated by the controller 44, so that the second reflector part 18 is pivoted in a direction about the vertical axis 42, so that the illumination is improved according to the course of the roadway.

The pivotability of the second reflector part 18 provided in the fifth embodiment of the headlight can be combined with that in the first or second embodiment. It is also possible to combine the pivotability of the second reflector part 18 about the vertical axis 42 with its pivotability about the horizontal axis 34 according to the third embodiment and its movability in the direction of the optic axis 19 according to the fourth embodiment.

Figure 13:
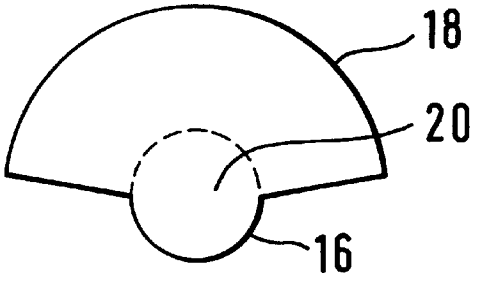
FIG. 13 is a front view of the headlight of FIG. 12.
Figure 14:
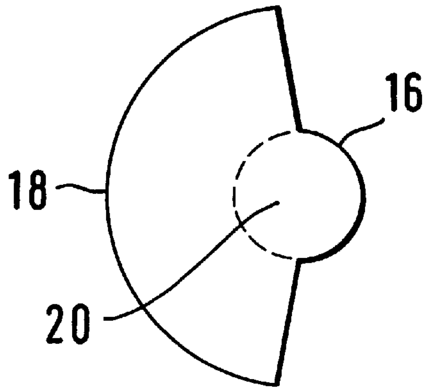
FIG. 14 is a front view of a modified embodiment according to the invention.

The headlight according to one of the previous embodiments is illustrated in FIG. 13 in a front view in a direction opposite to the light propagation direction. The second reflector part 18 is arranged above the first reflector part 16 and extends circumferentially less than 180°. The first reflector part 16 has an opening 20 in its upper peripheral section according to the size of the second reflector part 18. The second reflector part extends with a greater spacing from the light source 10 than the first reflector part. In FIG. 14 a front view of a headlight for a modified embodiment is shown. The second reflector part 18 is arranged substantially laterally beside the first reflector part 16 and has a peripheral extent of less than 180°. The second reflector part 18 extends downward until about at the vertical center plane of the first reflector part 16 and upward until it is not quite at the vertical center plane.

Figure 15:
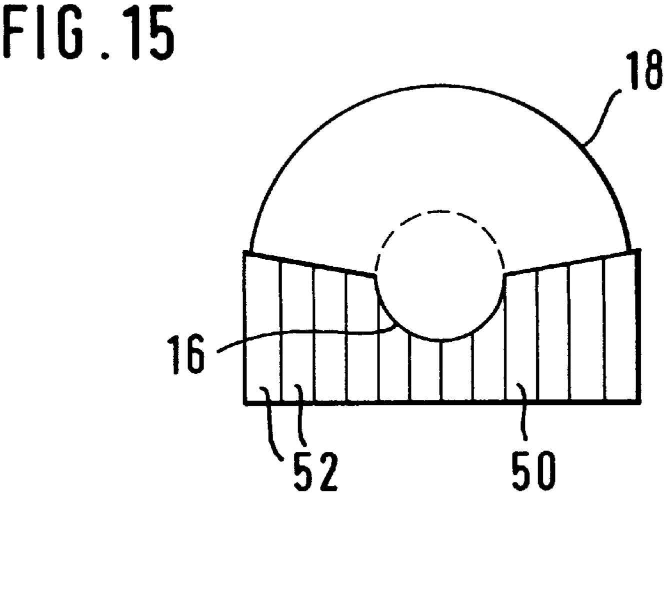
FIG. 15 is a front view of an additionally modified embodiment of the headlight.

An additional modified embodiment of the headlight is shown in a front view in FIG. 15. The second reflector part 18 is arranged above the first reflector part as in FIG. 13. A light permeable disk 50 is connected on the second reflector part 16 and surrounds the first reflector part 16. Light that is not caught by the first reflector part 16 and is propagated by the light source 10 passes through the light permeable disk 50. The disk 50 can have an optical profile or shape by which light passing through it is deflected, for example scattered in a horizontal direction. When viewed from the front in the operating configuration for low beam light the first reflector part 16 and the disk 50 appear illuminated. The subjective glare appearance of the headlight can be reduced by the disk 50 in the operating configuration for low beam light, since the illuminated area of the headlight is larger. The first reflector part 16, the disk 50 and the second reflector part 18 are illuminated in the operating configuration for high beam light.

The embodiment of the headlight according to FIGS. 13 to 15 regarding the arrangement of the second reflector part 18 and the disk 50 can be provided as in the previously described exemplary embodiments.

The present invention is also described in German Patent Application 197 56 437.2 of Dec. 18, 1997, which is incorporated here by reference and forms the basis for a claim of priority under 35 U.S.C. 119 for the appended claims.

While the invention has been illustrated and described as embodied in a headlight for a vehicle for low beam light and high beam light, it is not intended to be limited to the details shown, since various modifications and structural changes may be made without departing from the spirit of the present invention.

Without further analysis, the foregoing will so fully reveal the gist of the invention that others can, by applying current knowledge, readily adapt it for various applications without omitting features that, from the standpoint of the prior art, fairly constitute essential characteristics of the generic and specific aspects of the present invention.

What is claimed is new and desired to be protected by Letters Patent is set forth in the appended claims:

1. A headlight of a vehicle for a high beam and a low beam, said headlight comprising:

a light source (10);

a reflector (12) arranged to reflect light propagated from the light source (10), said reflector (12) including a first reflector part (16) arranged in relation to the light source so that at least light reflected by the first reflector part (16) forms the low beam in an operating configuration for low beam in an operating configuration for low beam light and a second reflector part (18) arranged at least one of substantially above and substantially beside the first reflector part (16) so that the high beam is formed by light reflected from the second reflector part together with the light reflected from the first reflector part in the operating configuration for the high beam light;

a lens (26) and a stop (22) arranged in a path of the light reflected by the first reflector part (16), wherein the stop (22) is provided with an edge (24) for producing a light-dark boundary at least for the low beam;

means for moving the second reflector part (18) so that the light reflected from the second reflector part (18) contributes to the low beam in the operating configuration for the low beam light and so that the light reflected from the second reflector part (18) has a greater range in the operating configuration for the high beam light than in the operating configuration for the low beam light;

the second reflector part (18) producing a concentrated light beam width comparatively high illumination intensities above the light-dark boundary in the operating configuration for high beam light;

the second reflector part (18) being pivotable about an approximately horizontal pivot axis (34) between an operating position for the low beam and an operating position for the high beam light.

2. The headlight as defined in claim 1, further comprising light-blocking means (28) for preventing the light propagated from the light source (10) from reaching the second reflector part (18) in the operating configuration for the low beam light and for allowing the light propagated from the light source (10) to reach the second reflector part (18) in the operating configuration for the high beam light.

3. The headlight as defined in claim 1, further comprising light-blocking means for blocking the light reflected from the second reflector part (18) in the operating configuration for the low beam light and for allowing the light reflected from the second reflector part (18) to issue from the headlight in the operating configuration for the high beam light.

4. The headlight as defined in claim 1, further comprising means for moving the second reflector part (18) so that the light reflected by the second reflector part (18) cannot issue from the headlight in the operating configuration for the low beam light but can issue from the headlight in the operating configuration for the high beam light.

5. The headlight as defined in claim 4, wherein the second reflector part (18) is pivotable about an approximately horizontal pivot axis (34) between an operating position for the low beam light and an operating position for the high beam light.

6. The headlight as defined in claim 1, wherein the means for moving the second reflector part (18) moves the second reflector part longitudinally at least approximately in a direction of an optic axis (19) of the second reflector part (18).

7. The headlight as defined in claim 6, wherein the second reflector part (18) is formed so that scattering at least in a horizontal direction from a reflected light propagation direction for light reflected from the second reflector part is changed by a longitudinal motion of the second reflector part.

8. The headlight as defined in claim 7, further comprising means for controlling the longitudinal motion of the second reflector part according to a vehicle speed so that a more concentrated light beam with comparatively reduced scatter is reflected from the second reflector part at a comparatively higher vehicle speed than at a comparatively lower vehicle speed.

9. The headlight as defined in claim 1, further comprising means for changing a position of said edge of said stop in the operating configuration for high beam light in contrast to the position of said edge of said stop in the operating configuration for low beam light so that said edge of said stop projects less into the path of the light reflected from the first reflector part.

10. The headlight as defined in claim 1, further comprising means for pivoting the second reflector part (18) about an at least approximately vertical pivot axis (42).

11. The headlight as defined in claim 10, wherein the means for pivoting the second reflector part (18) pivots the second reflector part (18) about the vertical pivot axis according to a direction in which the vehicle is steered by a steering drive means.

* * * * *